US009140029B2

(12) United States Patent
Jones et al.

(10) Patent No.: US 9,140,029 B2
(45) Date of Patent: Sep. 22, 2015

(54) TOWER ERECTING SYSTEM

(71) Applicant: Illinois Tool Works Inc., Glenview, IL (US)

(72) Inventors: Jerald Edward Jones, Golden, CO (US); Valerie Lisa Rhoades, Golden, CO (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 13/720,535

(22) Filed: Dec. 19, 2012

(65) Prior Publication Data

US 2013/0186013 A1    Jul. 25, 2013

Related U.S. Application Data

(60) Provisional application No. 61/589,170, filed on Jan. 20, 2012.

(51) Int. Cl.
*E04H 12/18* (2006.01)
*E04H 12/34* (2006.01)
*B66C 23/18* (2006.01)
(Continued)

(52) U.S. Cl.
CPC ............ *E04H 12/344* (2013.01); *B66C 23/185* (2013.01); *E04H 12/18* (2013.01); *E04H 12/182* (2013.01); *E04H 12/34* (2013.01); *E04H 12/342* (2013.01); *F03D 1/001* (2013.01); *F03D 11/04* (2013.01); *F05B 2230/61* (2013.01); *Y02E 10/728* (2013.01)

(58) Field of Classification Search
CPC ..... E04H 12/34; E04H 12/342; E04H 12/344; E04H 12/345; E04H 12/18; E04H 12/182; B66C 23/185

USPC ........................................................ 52/126.1
See application file for complete search history.

(56) References Cited

U.S. PATENT DOCUMENTS 2,675,211 A * 4/1954 Regoord ...................... 254/387
2,952,340 A * 9/1960 Schiff ............................ 403/11
3,135,363 A * 6/1964 Bourassa ..................... 52/296

(Continued)

FOREIGN PATENT DOCUMENTS

DE    19647515 A1    5/1998
DE    19741988 A1    4/1999

(Continued)

OTHER PUBLICATIONS

PCT International Search Report & Written Opinion of PCT/US2013/021887 dated Apr. 22, 2013, 12 pages.

(Continued)

*Primary Examiner* — Andrew J Triggs
(74) *Attorney, Agent, or Firm* — Fletcher Yoder P.C.

(57) ABSTRACT

In certain embodiments, a tower lifting system comprises a primary lifting system and a secondary lifting system. The primary lifting system includes a lift cap configured to support a tower section to be lifted, the lift cap having a first plurality of hoists, and a lift pole coupled to the lift cap, the lift pole having a lifting mechanism configured to lift the lift cap, the lift pole, and the tower section to be lifted from within a previously lifted tower section. The secondary lifting system comprises a second plurality of hoists configured to raise the tower section to be lifted to the lift cap from a tower foundation.

10 Claims, 6 Drawing Sheets

(51) Int. Cl.
*F03D 11/04* (2006.01)
*F03D 1/00* (2006.01)

(56) References Cited

U.S. PATENT DOCUMENTS

| | | | | |
|---|---|---|---|---|
| 3,196,991 | A * | 7/1965 | Johnson et al. | 52/115 |
| 3,213,574 | A * | 10/1965 | Melbye et al. | 52/121 |
| 3,248,831 | A * | 5/1966 | Jones | 52/121 |
| 3,373,473 | A * | 3/1968 | Keslin | 29/897.33 |
| 3,952,467 | A * | 4/1976 | Partlow | 52/121 |
| 4,261,931 | A | 4/1981 | Rothrock et al. | |
| 4,478,014 | A * | 10/1984 | Poock et al. | 52/115 |
| 4,580,377 | A * | 4/1986 | Sundin | 52/121 |
| 4,604,844 | A * | 8/1986 | Mikulas et al. | 52/632 |
| 4,696,135 | A * | 9/1987 | Kallinger et al. | 52/121 |
| 4,832,315 | A * | 5/1989 | Vanderklaauw | 254/89 H |
| 5,101,215 | A * | 3/1992 | Creaser, Jr. | 343/883 |
| 6,782,667 | B2 * | 8/2004 | Henderson | 52/116 |
| 7,642,987 | B2 * | 1/2010 | Newman | 343/874 |
| 7,966,777 | B2 * | 6/2011 | Douglas et al. | 52/118 |
| 8,492,918 | B1 | 7/2013 | Kamenov | |
| 2010/0095508 | A1 | 4/2010 | Wahlen et al. | |
| 2013/0186013 | A1 * | 7/2013 | Jones et al. | 52/126.1 |

FOREIGN PATENT DOCUMENTS

| | | |
|---|---|---|
| DE | 102011050032 | 11/2012 |
| DE | 202012011382 | 11/2013 |
| EP | 1350953 A2 | 10/2003 |
| EP | 1857670 A1 | 11/2007 |

OTHER PUBLICATIONS

International Search Report from PCT application No. PCT/US2015/016515, dated Apr. 16, 2015, 10 pgs.

* cited by examiner

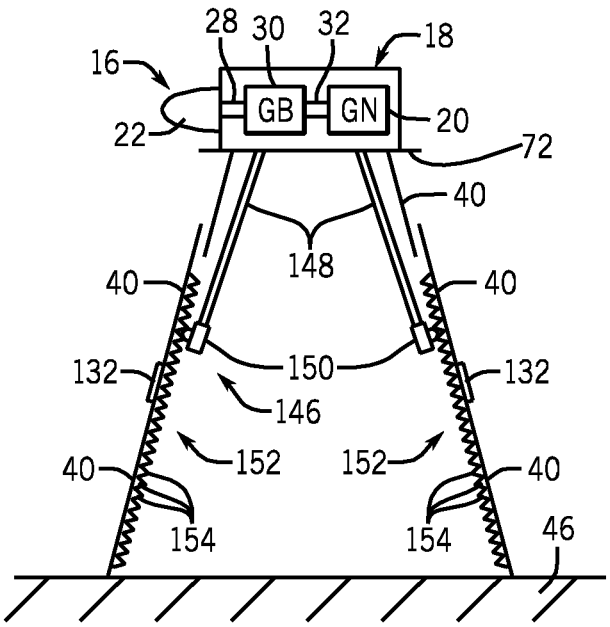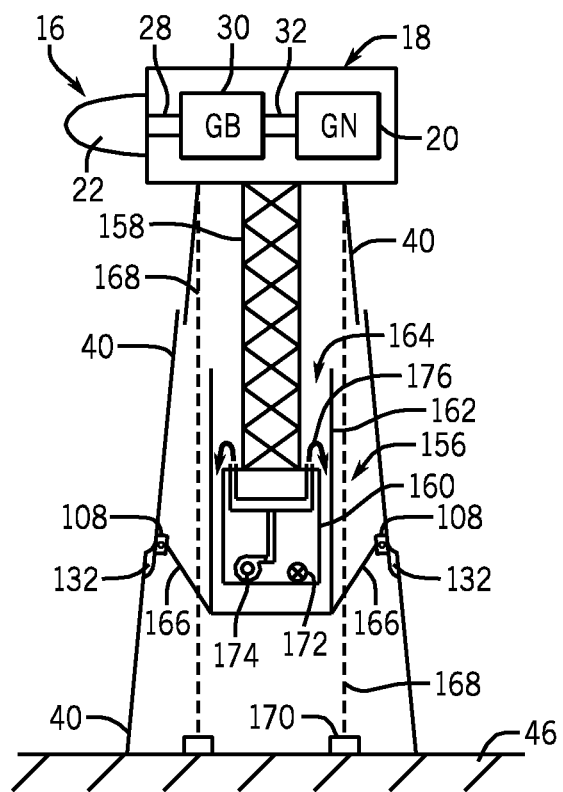

TOWER ERECTING SYSTEM

CROSS REFERENCE TO RELATED APPLICATIONS

This application is a Non-provisional U.S. Patent Application of U.S. Provisional Application No. 61/589,170, entitled "Tower Erecting System," filed Jan. 20, 2012, which is herein incorporated by reference.

BACKGROUND

The invention relates generally to wind energy systems, and, more particularly, to a system and method for constructing a wind energy tower system.

Towers for wind energy systems exist in several forms. Generally, a wind tower includes a tower structure with a wind turbine affixed at the top of the tower structure. Thus, as the wind tower height increases, the wind turbine is placed at higher altitudes. Generally, wind velocity and consistency increase with altitude. As a result, a wind turbine can often produce more electrical energy, and more consistently, and thus generate more income, when placed at a higher altitude. However, the cost of these wind towers increases as the wind tower height increases. Moreover, for some tower types, the tower, transportation, and construction costs increase with tower height at a faster rate than the additional income generating potential. Therefore, at some tower height, the increasing cost of the tower is such that the net revenue from the generated electrical energy begins to decrease with increasing tower height. Additionally, for some tower types, there may be construction equipment limitations, such as crane height. That is, the height of the tower may be limited by the height of the crane used to construct the tower. Unfortunately, these constraints limit the practical altitude of wind turbines.

BRIEF DESCRIPTION

In an exemplary embodiment, a tower lifting system comprises a primary lifting system and a secondary lifting system. The primary lifting system includes a lift cap configured to support a tower section to be lifted, the lift cap having a first plurality of hoists, and a lift pole coupled to the lift cap, the lift pole having a lifting mechanism configured to lift the lift cap, the lift pole, and the tower section to be lifted from within a previously lifted tower section. The secondary lifting system comprises a second plurality of hoists configured to raise the tower section to be lifted to the lift cap from a tower foundation.

In another exemplary embodiment, a tower lifting system comprises a secondary lifting system configured to raise a tower section of a multi-section tower to a lifting position and a primary lifting system configured to raise the tower section and the secondary and primary lifting systems to an assembled position.

In a further embodiment, a method for erecting a tower includes nesting frusto-conical tower sections within one another and within a frusto-conical tower base and securing the frusto-conical tower base to a tower foundation. The method further includes lifting each frusto-conical tower section from within the frusto-conical tower base with a lifting apparatus and securing each frusto-conical tower section to the frusto-conical tower base or to a previously lifted frusto-conical tower section.

DRAWINGS

These and other features, aspects, and advantages of the present invention will become better understood when the following detailed description is read with reference to the accompanying drawings in which like characters represent like parts throughout the drawings, wherein:

FIG. 9 is a schematic of an embodiment of the lifting apparatus for a wind tower, illustrating a rack and pinion lifting system;

FIG. 10 is a schematic of an embodiment of the lifting apparatus for a wind tower, illustrating a floatation lifting system;

DETAILED DESCRIPTION

The present disclosure describes a tower which can support large wind turbines, or other heavy components, and a system and method for erecting such a tower without the need for a large external lifting system, such as a crane. In certain embodiments, the tower includes multiple frusto-conical tower sections which, when lifted from within one another, fit together with a very tight clearance. Specifically, a bottom portion of the tower section being lifted overlaps within a top portion of a previously lifted tower section. In other words, the outside diameter and shape of the bottom portion of the tower section being lifted is designed to match the inside diameter and shape of the top portion of the previously erected tower section. The two tower sections mate with a small overlap, where there is essentially zero clearance between the outside surface of the upper tower section and the inside surface of the tower section below it. The two tower sections may be welded together at the top of the overlap and the bottom of the overlap.

As discussed in detail below, prior to the tower erection process, the tower sections are nested inside one another at the base of the tower. A lifting apparatus is used to individually lift each of the tower sections into place. Specifically, a primary lifting system is located inside the tower section being lifted and may extend at least one tower section length below the bottom of the tower section being lifted. The primary lifting system lifts the tower section and the entire lifting apparatus until the tower section emerges out of the top of the previously erected tower section. The primary lifting system holds the tower section in place while the tower section is secured (e.g., welded) to the tower section previously lifted. Once the tower section is welded in place, a secondary lifting system of the lifting apparatus raises the next tower section from its resting place at the base of the tower and holds the next tower section. Thereafter, the primary lifting system lifts the next tower section, which is being held by the secondary lifting system, and the entire lifting apparatus until the next tower section is in place for welding.

Figure 1:
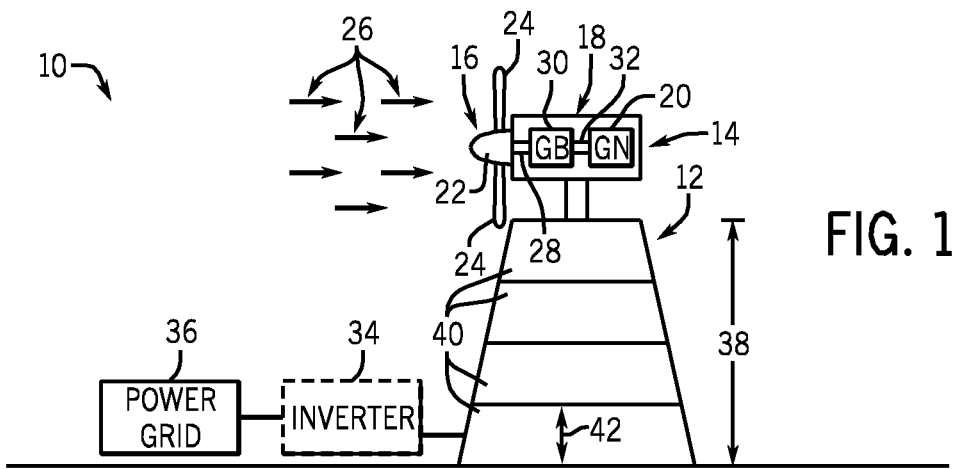
FIG. 1 is a diagrammatical representation of a wind power system.

Turning now to the drawings, FIG. 1 is a diagrammatical representation of a wind power system 10 including a wind tower 12 which may be erected using a lifting apparatus. The wind tower 12 supports a wind turbine 14 configured to convert wind energy into electrical energy. In the illustrated embodiment, the wind turbine 14 is a horizontal axis wind turbine, but, in other embodiments, the wind turbine 14 may be a vertical axis wind turbine. The wind turbine 14 includes a rotor 16 coupled to a nacelle 18, which houses a generator 20. The rotor 16 includes a hub 22 and blades 24 which convert the wind energy into low speed rotational energy. Specifically, as wind 26 blows past the blades 24, the blades 24, and therefore the hub 22, are driven into rotation. The rotor 16 is further coupled to a low speed shaft 28 within the nacelle 18. The low speed shaft 28 is coupled to a gear box 30 which converts the low speed rotation of the low speed shaft 28 into a high speed rotation suitable for generating electricity. Specifically, the gear box 30 transfers the rotational energy of the low speed shaft 28 to a high speed shaft 32. The high speed shaft 32 is further coupled to the generator 20, which converts the rotational energy into electrical energy. In other embodiments, the wind turbine 14 may include other components such as a direct drive or multiple generators 20.

In certain embodiments, the wind power system 10 may have an inverter 34. Specifically, the electricity generated by the generator 20 may be routed to an inverter 34 coupled to the wind tower 12. The inverter 34 converts the electricity from direct current (DC) to alternating current (AC). From the inverter 34, the electricity is supplied to a power grid 36. From the power grid 36, the electricity may be distributed to homes, buildings, and other consumers of electricity.

In the illustrated embodiment, the wind tower 12 has a height 38. Additionally, the wind tower 12 is constructed from multiple tower sections 40. Each tower section 40 has a frusto-conical shape. As discussed in detail below, the wind tower 12 may be erected by lifting the tower sections 40 from within one another. More specifically, a lifting apparatus is used to individually lift each tower section 40 and hold the tower section 40 in place while the tower section 40 is secured (e.g., welded) to the previously erected tower section 40 below it. In certain embodiments, the wind tower 12 may include approximately 3 to 40 tower sections 40. Furthermore, the tower sections 40 each have a height 42, which may be approximately 40 to 100 feet or more. Consequently, the height 38 of the wind tower 12 may be approximately 150 to 1500 feet or more. Furthermore, as the height 38 of the wind tower 12 increases, the diameter of the tower sections 40 may increase, thereby increasing the load capacity of the wind tower 12. As a result, the wind tower 12 may be capable of supporting a nacelle 18 having a larger generator 20, such as a 1-10 million watt generator 20.

Figures 2A, 2B, 2C:
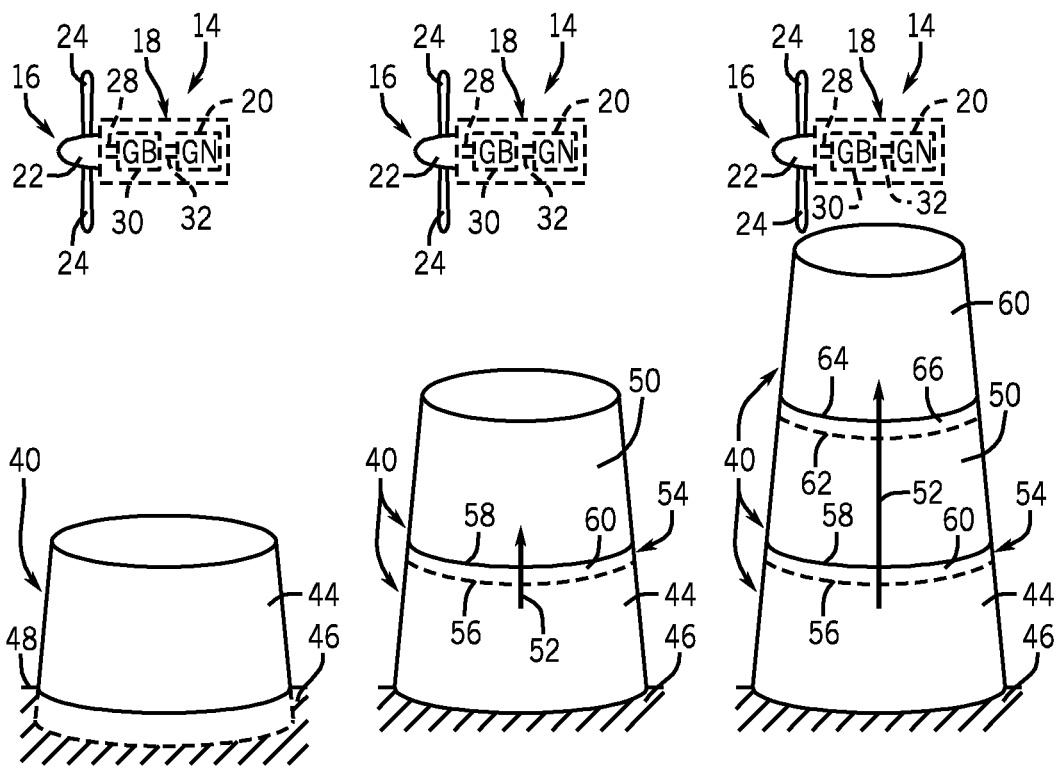
FIG. 2A is a diagrammatical representation of a partially constructed wind tower having frusto-conical tower sections.
FIG. 2B is a diagrammatical representation of a partially constructed wind tower having frusto-conical tower sections.
FIG. 2C is a diagrammatical representation of a partially constructed wind tower having frusto-conical tower sections.

FIGS. 2A-2C are schematics of the wind tower 12 in various stages of assembly, illustrating the joints between the tower sections 40. As mentioned above, the wind tower 12 includes multiple tower sections 40, each tower section 40 having a frusto-conical, hollow shape. FIG. 2A illustrates a first tower section 44 which serves as the base of the wind tower 12. As shown, the first tower section 44 rests on a foundation 46 of the wind tower 12. In certain embodiments, the foundation 46 may be formed from concrete. The first tower section 44 is rigidly attached to the foundation 46 by a foundation anchor method. For example, the first tower section 44 may be secured to the foundation 46 with a composite material. The composite material may include a rock and gravel aggregate mixed with a polymer based matrix material. In such an embodiment, a recess in the foundation 46 allows the first tower section 44 to rest partially below a top 48 of the foundation 46. The composite material is used to fill the recess, thereby surrounding and bonding the first tower section 44 to the foundation 46. In another embodiment, the first tower section 44 may be bolted to the foundation 46. Specifically, the first tower section 44 may have a ring welded to a bottom of the first tower section 44. The ring may have holes spaced around the circumference of the ring. The locations of the holes are such that bolts affixed to, and protruding from, the foundation 46 are received by the holes. With the bolts of the foundation 46 extending through the holes of the ring, nuts are placed onto the end of the bolts and are tightened down, thereby rigidly securing the first tower section 44 to the foundation 46.

FIG. 2B illustrates a second tower section 50 assembled and secured to the first tower section 44. As discussed above, each tower section has a frusto-conical, hollow shape. As a result, the tower sections 40 may be designed to fit together with a very tight clearance. Specifically, the outside diameter and shape of the bottom portion of the tower section 40 being lifted is designed to match the inside diameter and shape of the top portion of the previously erected tower section 40. In the illustrated embodiment, the second tower section 50 is lifted from within the first tower section 44 in a direction 52. In certain embodiments, the second tower section 50 may be lifted by a crane or other external lifting apparatus. As indicated by reference numeral 54, a bottom portion 56 of the second tower section 50 and a top portion 58 of the first tower section 44 fit together with a very tight clearance to create an overlap 60. In other words, the bottom portion 56 of the second tower section 50 remains inside the first tower section 44. With the second tower section 50 lifted in the final erected position, two lap welds are completed. A first lap weld is completed along the top portion 58 of the first tower section 44, thereby joining the top portion 58 to the outside of the second tower section 50. A second lap weld is made along the bottom portion 56 of the second tower section 50, thereby joining the bottom portion 56 to the inside of the first tower section 44.

FIG. 2C illustrates a third tower section 60 assembled and secured to the second tower section 50. As similarly discussed above, the third tower section 60 is lifted from within the first and second tower sections 44 and 50 in the direction 52. The frusto-conical, hollow shape of the second and third tower sections 50 and 60 enables a bottom portion 62 of the third tower section 60 to overlap with a top portion 64 of the second tower section 50 to create an overlap 66. In the manner discussed above, two lap welds are completed to secure the second and third tower sections 50 and 60. As will be appreciated, the wind tower 12 erection process described above is repeated for all tower sections 40 of the wind tower 12. The discussion below describes a lifting apparatus which may be used to complete this erection process without the need for a large external lifting system, such as a crane.

Figure 3:
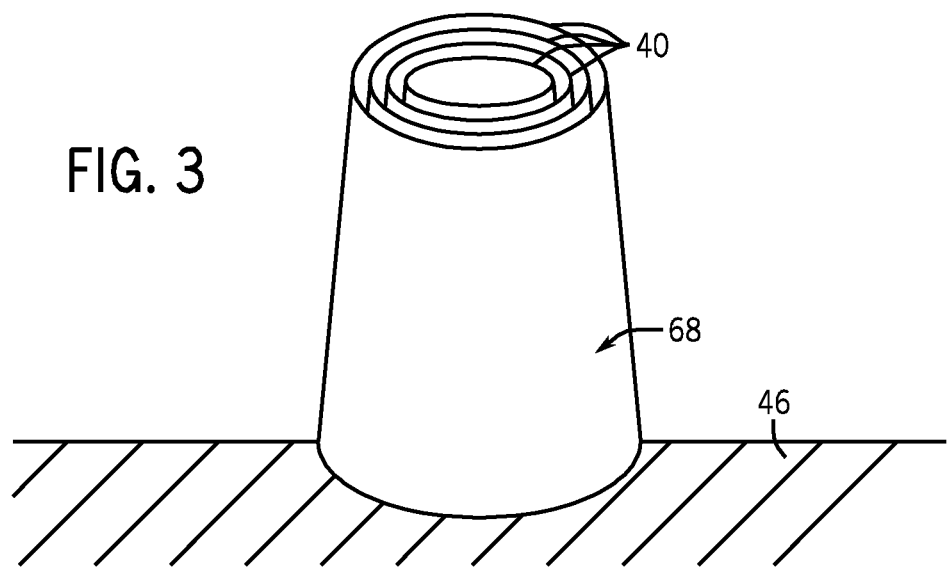
FIG. 3 is a perspective view of unassembled frusto-conical tower sections resting on a tower foundation in a nested arrangement.

FIG. 3 illustrates a nested arrangement of tower sections 40, prior to the beginning of the wind tower 12 erection process. As mentioned above, prior to the erection process, the tower sections 40 are placed onto the foundation 46 at ground level. More specifically, the tower sections 40 are "nested" inside one another. In other words, each tower section 40 is placed outside of the next smallest tower section 40. In the illustrated embodiment, the tower sections have sides 68 which have a round cross-section. However, in other embodiments, the sides 68 of the tower sections 40 may have a polygonal, circular, oval, corrugated, or fluted cross-section, as described in greater detail below with respect to FIGS. 11-13.

Figure 4:
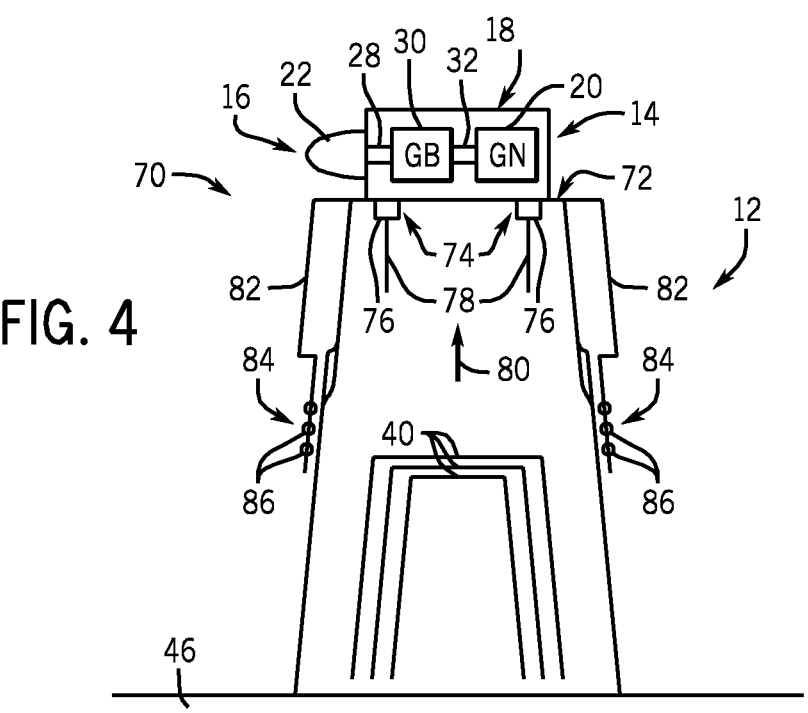
FIG. 4 is a schematic of an embodiment of a lifting apparatus for a wind tower, illustrating a lift cap and a secondary lifting system of the lifting apparatus.

FIG. 4 is a schematic of an embodiment of a lifting apparatus 70 for the wind tower 12, illustrating a lift cap 72 and a secondary lifting system 74 of the lifting apparatus 70. In order to stabilize the lifting apparatus 70 and the tower section 40 being lifted, the lifting apparatus 70 includes the lift cap 72. Specifically, the lift cap 72 is placed on top of the nested tower sections 40 before the erecting process begins. Alternatively, in certain embodiments, the first several tower sections 40 may be lifted and secured (e.g., welded) using a conventional crane. In such an embodiment, the lift cap 72 may be placed on the top of the most recently lifted tower section 40 before the lifting apparatus 70 is used. During the erecting process, the lift cap 72 is coupled to the tower section 40 currently being lifted. Additionally, the nacelle 18, which houses the generator 20 and other components of the wind turbine 14, is placed on top of, and is attached to, the lift cap 72. In this manner, as the lifting apparatus 70 lifts each tower section 40, the lifting apparatus also raises the lift cap 72 and the nacelle 18 of the wind turbine 14.

Each tower section 40 to be lifted is first raised from its resting position on the foundation 46 at the base of the wind tower 12. Specifically, the secondary lifting system 74 includes hoists 76 which raise the tower section 40 with cables 78. For example, the hoists 76 may be electric or hydraulic winches. The tower section 40 to be lifted is raised in the direction 80 until the tower section 40 is against the bottom of the lift cap 72. Once the tower section 40 has been raised up to the lift cap 72, the tower section 40 is coupled to the lift cap 72 using lugs and pins. For the duration of the lift and welding sequence, the tower section 40 is held in this position against the lift cap 72. As discussed in detail below, once the tower section 40 to be lifted is raised by the secondary lifting system 74 and coupled to the lift cap 72, a primary lifting system is used to lift the tower section 40, the lift cap 72, and the nacelle 18.

While the tower section 40 is being lifted into place by the primary lifting system, the tower section 40 may be subjected to undesired movement due to wind and other loads. To help reduce undesired lateral movement of the tower section 40 during the lifting and welding sequence, the lift cap 72 includes guide arms 82 which extend down a portion of the wind tower 12 that has already been erected and welded. For example, in certain embodiments, the lift cap 72 may include a plurality of structural members, such as I-beams, that extend from one side of the tower section 40 to the opposite side of the tower section 40, with each end of the structural members coupled to a respective guide arm 82. As such, because the guide arms 82 are positioned on opposite sides of the tower section 40, they generally pull against each other and maintain forces evenly amongst the opposite sides. Any even number of opposite guide arms 82 may be used. For example, in certain embodiments, six or twelve opposite guide arms 82 may be used. In general, the number of guide arms 82 may depend on the specific configuration of the tower 12 being erected.

The guide arms 82 rest against the erected and welded portion of the wind tower 12, thereby preventing horizontal motion of the guide arms 82, the lift cap 72, and the tower section 40 coupled to the lift cap 72. Additionally, each guide arm 82 includes a guide mechanism 84 which provides for relative vertical motion of the guide arms 82 and the lift cap 72 with respect to the welded portion of the wind tower 12. For example, the guide mechanism 84 may include wheels 86, as shown, a track mechanism, or other mechanism configured to allow vertical motion of the guide arms 82 with respect to the erected portion of the wind tower 12.

Figure 5:
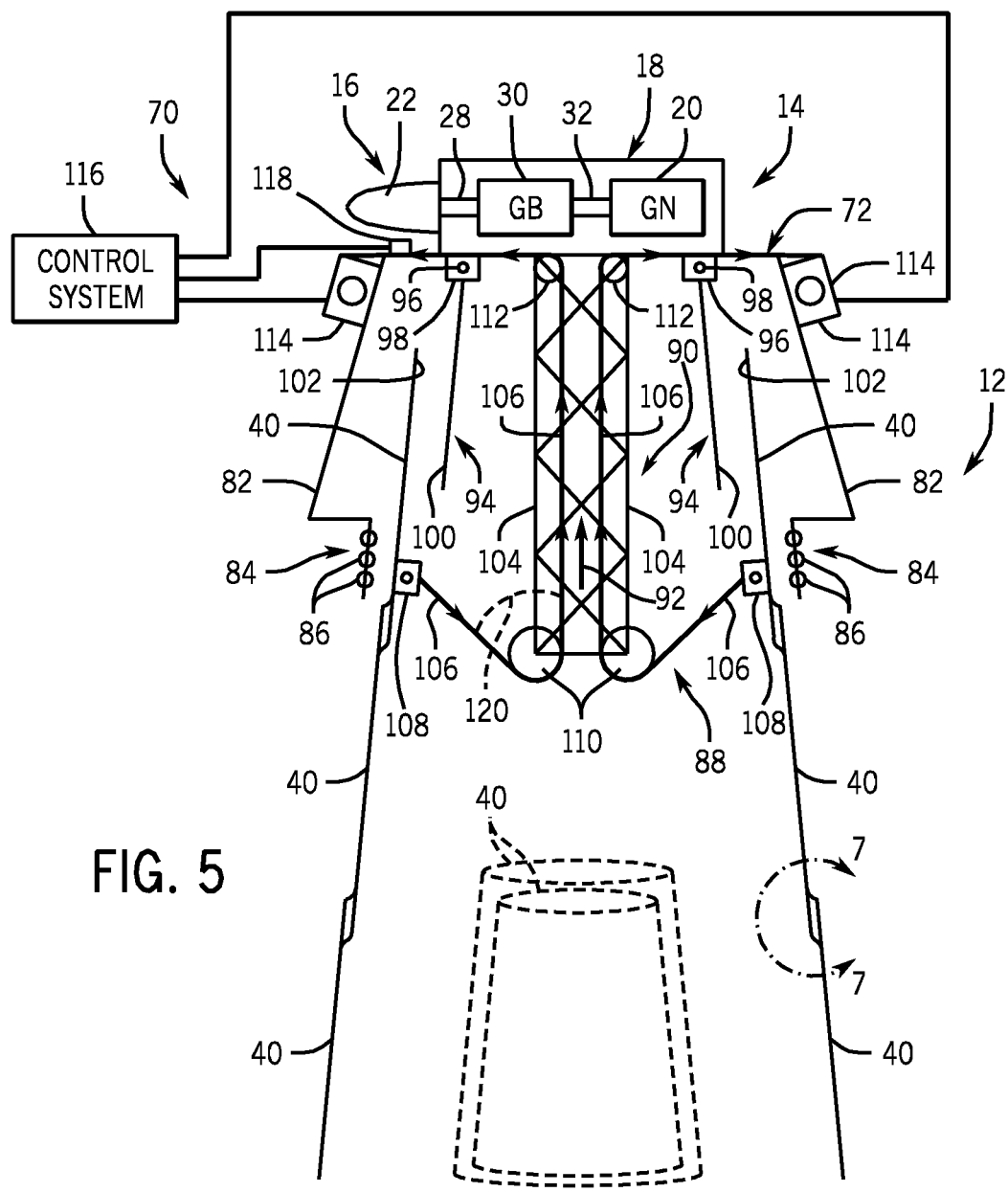
FIG. 5 is a schematic of an embodiment of the lifting apparatus for a wind tower, illustrating a lift cap and a primary lifting system of the lifting apparatus.

FIG. 5 is a schematic of an embodiment of the lifting apparatus 70 for the wind tower 12, illustrating the lift cap 72 and a primary lifting system 88 of the lifting apparatus 70. In the illustrated embodiment, the primary lifting system 88 comprises a cable lift system 90. As discussed in detail below, the cable lift system 90 operates to push the lift cap 72 upwards, in a direction 92, thereby lifting the nacelle 18 on top of the lift cap 72 and the tower section 40 which is held against the bottom of the lift cap 72. In the illustrated embodiment, a tower section 94 that has been lifted by the secondary lifting system 74 is coupled to the bottom of the lift cap 72 by lugs 96 and bolts 98. The cable lift system 90 continues to lift the lift cap 72, the nacelle 18, and the tower section 94 until the outside of a bottom portion 100 of the tower section 94 is up against the inside of a top portion 102 of the previously erected tower section 40. Once the tower section 94 is in place, the bottom portion 100 of the tower section 94 and the top portion 102 of the previously erected tower section 40 are welded together using a double lap joint.

The cable lift system 90 includes a lift pole 104. In certain embodiments, the lift pole 104 may be approximately twice as long in length as the tower sections 40. For example, the lift pole 104 may be approximately 60, 70, 80, 90, 100, or more feet in length. Due to the length of the lift pole 104 being greater than the length of a single tower section 40, the first single or several tower sections 40 may be lifted and held in place for welding by a conventional crane or other external lifting apparatus, as discussed above. Similarly, while the illustrated embodiment does not show the blades 24 of the rotor 16 coupled to the hub 22, the blades 24 may also be raised and attached to the hub 22 with a conventional crane or other external lifting apparatus. For example, in certain embodiments, the blades 24 may be raised and attached to the hub 22 after 2, 3, 4, or 5 tower sections 40 have been lifted and welded in place.

Once the tower section 94 is coupled to the lift cap 72, cables 106 are coupled to lifting lugs 108 located at the bottom of the previously erected tower section 40. The cables 106 are then directed down to lower pulleys 110 at the bottom of the lift pole 104. The cables 106 are routed upwards to upper pulleys 112 at the top of the lift pole 104 and are then connected to hoists 114. In the illustrated embodiment, the hoists 114 are disposed on the outside of the arms 82 of the lift cap 72. In other embodiments, the hoists 114 may be located on the inside of the arms 82 or on another portion of the lift cap 72. For example, the hoists 114 may be electric or hydraulic winches. Moreover, the cable lift system 90 may include 3 to 20 hoists 114, with each hoist 114 connected to a respective cable 106. Once the cables 106 are connected to the hoists 114, the cables 106 are pulled by the hoists 114 (i.e., reeled in) until tight, at which point the lift pole 104, the lift cap 72, the nacelle 18, and the tower section 94 are supported by the cables 106. In this manner, the hoists 114 and the cables 106 raise the lift pole 104, the lift cap 72, the nacelle 18, and the tower section 94 in the direction 92.

The lifting apparatus 70 further includes a control system 116 coupled to the hoists 114 and coupled to a leveling sensor 118. As shown, the leveling sensor 118 is coupled to the lift cap 72. Certain embodiments may include multiple leveling sensors 118. The leveling sensor 118 is configured to monitor an angle of the lift cap 72. More specifically, the leveling sensor 118 monitors whether the lift cap 72 is level or tilted. Using feedback from the leveling sensor 118, the control system 116 coordinates the rate of pull of the hoists 114 to lift the tower section 94 and the nacelle 18. Specifically, the control system 116 operates the hoists 114 to reel in the cables 106 to lift the lift pole 104, thereby raising the nacelle 18 and the tower section 94. As will be appreciated, the weight and position of the generator 20 within the nacelle 18 may cause an uneven weight distribution on the lift cap 72. As a result, some hoists 114 may need to have a greater lifting capacity than other hoists 114, depending on the location of the respective hoist 114 relative to the generator 20. Additionally, as the hoists 114 reel in the cables 106, the uneven weight distribution may cause the certain hoists 114 to reel in cables faster than others. The leveling sensor 118 detects the uneven raising of the lift cap 72 and communicates the unevenness to the control system 116. In response, the control system 116 sends control signals to some or all of the hoists 114 to adjust the operation of each hoist 114 accordingly. For example, the control system 116 may stop the operation of some hoists 114 while continuing the operation of other hoists 114, as necessary, to bring the lift cap 72 back to a level orientation.

As mentioned above, the lift pole 104 may have a length approximately twice the length of the tower section 40. As will be appreciated, as the cables 106 are reeled in by the hoists 114, an angle 120 formed by each cable 106 extending from the lifting lugs 108, around the lower pulleys 110, and up to the upper pulleys 112 will increase. However, the angle 120 may be reduced by increasing the length of the lift pole 104. For example, during the lifting process with a lift pole 104 having a length approximately twice as great as the length of the tower section 94, the angle 120 may not increase beyond 15, 20, 25, or 30 degrees. As a result, the force applied to the lifting lugs 108 by the cables 106 in the horizontal direction as the cables 106 are reeled in by the hoists 114 may be reduced.

Figure 6:
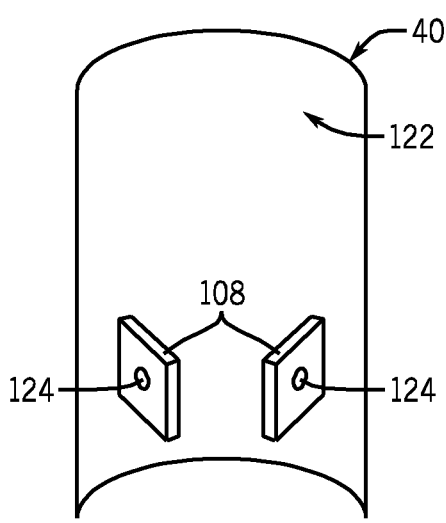
FIG. 6 is a partial cross-sectional view of an interior of a tower section, illustrating lifting lugs of the tower section.

FIG. 6 is a partial cross-sectional view of an interior surface 122 of a tower section 40, illustrating lifting lugs 108 of the tower section 40. As mentioned above, the cables 106 used to lift the lift pole 104, the lift cap 72, and the individual tower sections 40 are connected to lifting lugs 108. Each lifting lug 108 extends generally perpendicularly from the interior surface 122 of the tower section 40 and has an aperture 124 through which the respective cable 106 is inserted and secured to the lifting lug 108. In certain embodiments, the lifting lugs 108 may be formed from steel and may be welded to the interior surface 122 of the tower section 40. As will be appreciated, each tower section 40 may have at least as many lifting lugs 108 as cables 106 used in the cable lift system 90.

Figure 7:
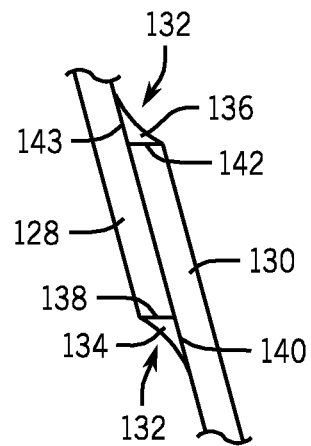
FIG. 7 is a partial cross-sectional side view, taken along line 7-7 of FIG. 5, illustrating two lap welds joining two tower sections.

FIG. 7 is a partial cross-sectional side view, taken along line 7-7 of FIG. 5, of an upper tower section 128 and a lower tower section 130, illustrating two lap welds 132 joining the upper tower section 128 (i.e., the tower section 40 being lifted) and the lower tower section 130 (i.e., the previously erected tower section 40). Once the primary lifting system 88, e.g., the cable lift system 90, has raised the upper tower section 128 such that the bottom portion of the upper tower section 128 has contacted the top portion of the lower tower section 130, the two tower sections 128 and 130 are joined with two lap welds 132. Specifically, an inner lap weld 134 and an outer lap weld 136 are created between the two tower sections 128 and 130. In certain embodiments, the outer lap weld 136 is completed first, and the inner lap weld 134 is completed second. As shown, the inner lap weld 134 is made along a bottom edge 138 of the upper tower section 128 and joining to an inside surface 140 of the lower tower section 130. Similarly, the outer lap weld 136 is made along a top edge 142 of the lower tower section 130 and joining to an outside surface 143 of the upper tower section 128. As will be appreciated, the inner and outer lap welds 134 and 136 are completed along the entire circumference of the bottom edge 138 of the upper tower section 128 and the top edge 142 of the lower tower section 130, respectively.

Figure 8:
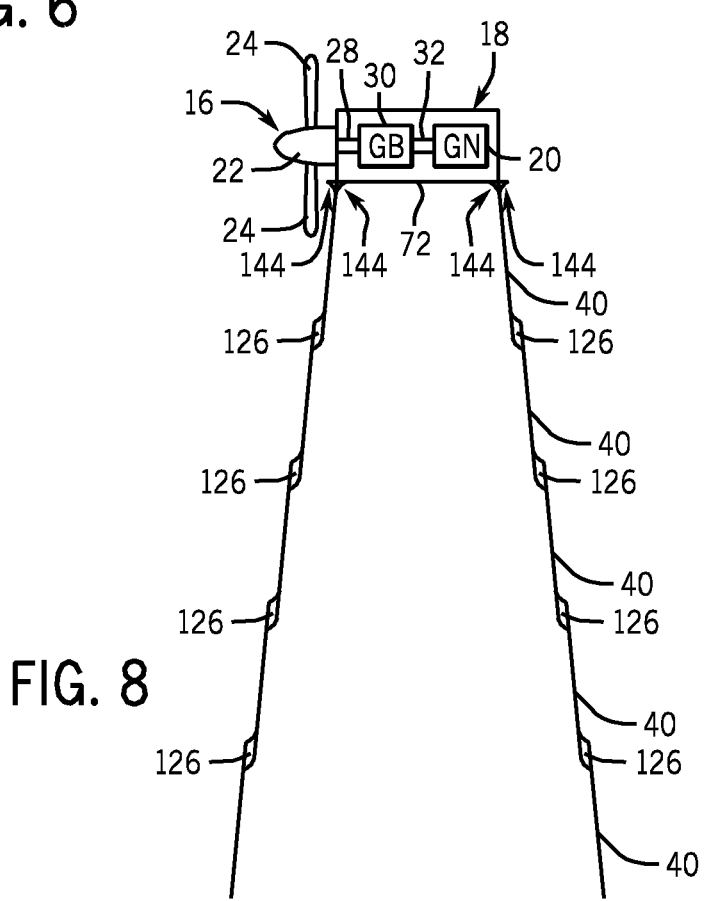
FIG. 8 is a schematic of a completed wind tower having frusto-conical tower sections.

FIG. 8 is a schematic of a completed wind tower 12 having frusto-conical, hollow tower sections 40. Once each tower section 40 has been lifted by the lifting apparatus 70, the lift cap 72 supporting the nacelle 18 is welded to the top tower section 40, as indicated by arrows 144. Additionally, the guide arms 82 of the lift cap 72 are disconnected from the lift cap 72 and lowered down to the base of the wind tower 12. Similarly, the lift pole 104 is lowered to the base of the wind tower 12. With the wind tower 12 fully erected and the nacelle 18 in place at the top of the wind tower 12, the wind tower 12 may be prepared for operation.

FIG. 9 is a schematic of an embodiment of the lifting apparatus 70 for the wind tower 12, wherein the primary lifting system 88 comprises a rack and pinion lifting system 146. In the illustrated embodiment, the tower section 40 to be lifted is raised up by the secondary lifting system 74 and secured to the bottom of the lift cap 72, in the manner described above. Thereafter, lift poles (i.e., rigid members) 148 coupled to the lift cap 72 are rotated outwards and coupled to motorized pinion drives 150 which are running on rails 152 having gear teeth 154. In operation, the pinion drives 150 engage with the gear teeth 154 on the rails 152 and drive the rigid members 148 upward, thereby lifting the lift cap 72, the nacelle 18, and the tower section 40. As with other embodiments of the lifting apparatus 70 discussed above, the rack and pinion system 146 may also include the control system 116 and the leveling sensor 118. As will be appreciated, using feedback from the leveling sensor 118, the control system 116 may coordinate the rate of upward motion of the pinion drives 150 on the rails 152 to maintain an even lifting rate of the lift cap 72, the nacelle 18, and the tower section 40 being lifted.

FIG. 10 is a schematic of an embodiment of the lifting apparatus 70 for the wind tower 12, wherein the primary lifting system 88 comprises a floatation lifting system 156. The floatation lifting system 156 includes a lift pole 158 coupled to the lift cap 72 and to a floatation device 160. For example, the floatation device 160 may be a closed container filled with air. Alternatively, the floatation device 160 may be an open container taller than the tank 162. The floatation device 160 is partially surrounded by and disposed within a tank 162 having an open top 164. The tank 162 is supported by cables 166 that are coupled to the bottom of the tank 162 and the lifting lugs 108 of the previously erected tower section 40.

In operation, the tower section 40 to be lifted is raised up by the secondary lifting system 74 and secured to the bottom of the lift cap 72, in the manner described above. The floatation lifting system 156 lifts the lift cap 72, the nacelle 18, and the tower section 40 when water or other suitable liquid is pumped into the tank 162. The water or liquid creates an upward buoyant force on the floatation device 160, which pushes the lift pole 158, lift cap 72, the nacelle 18, and the tower section 40 upward. In order to maintain an even lifting rate of the lift cap 72, cables 168 are coupled to the lift cap 72 and lowered to the tower foundation 46 where the cables 168 are attached to hoists 170 secured to the tower foundation 46. More specifically, as water is pumped into the tank 162 and the upward buoyant force of the flotation device 160 pushes the lift pole 158 and the lift cap 72 upwards, a balanced tension is maintained in the cables 168 so that the lift cap 72 does not tilt, thereby providing a level platform for the nacelle 18. In certain embodiments, the floatation lifting system 156 may include the control system 116 and the leveling sensor 118. As will be appreciated, using feedback from the leveling sensor 118, the control system 116 may control the operation of the hoists 170 to maintain a balanced tension between the cables 168.

Once the tower section 40 attached to the lift cap 72 is lifted and in place for welding, the pumping of water into the tank 162 may be stopped and/or the hoists 170 may hold the cables 168 in place, thereby holding the lift cap 72 and the tower section 40 in place. With the lift cap 72 and the tower section 40 in place, the tower section 40 is welded to the previously erected tower section 40 with two lap welds 126, in the manner described above. After the tower section 40 is welded in place, the next tower section 40 to be lifted may be raised up to the lift cap 72 using the secondary lifting system 74. Additionally, a valve 172 of the floatation device 160 may be opened and the tank 162 may be raised up. Specifically, the cables 166 may be coupled to the lifting lugs 108 of the previously erected tower section (i.e., the tower section that has just been welded in place). As the tank 162 is raised, the water within the tank 162 will enter the floatation device 160 through the valve 172, thereby causing the floatation device 160 to sink to the bottom of the tank 162. Thereafter, the valve 172 is closed and a pump 174 within the floatation device 160 may pump the water out of the floatation device 160 and into the tank 162, as indicated by arrows 176. As the water is pumped out of the floatation device 160 and into the tank 162, the displaced water will create an upward buoyant force on the floatation device 160, as described above, thereby pushing the lift pole 158, lift cap 72, the nacelle 18, and the tower section 40 upward.

As discussed above, embodiments of the present disclosure include a lifting apparatus 70 for a wind tower 12. Specifically, the lifting apparatus 70 is configured to erect the wind tower 12 by raising frusto-conical, hollow tower sections 40 from within the other assembled tower sections 40. In this manner, the wind tower 12 may be erected without the use of an external lifting apparatus, such as a conventional crane. This enables the construction of larger and taller wind towers 12 because the erection of the wind tower 12 is not limited by the availability or height of a crane used to erect the wind tower 12. For example, using the lifting apparatus 70, the wind tower 12 may be constructed and erected to stand approximately 400, 500, 600, 700, 800, 900, or more feet high. As a result, the wind turbine 14 located at the top of the wind tower 12 is placed at a higher altitude where both wind velocity and wind consistency may be higher, thereby enabling the wind power system 10 to generate more electrical energy.

Figure 13:
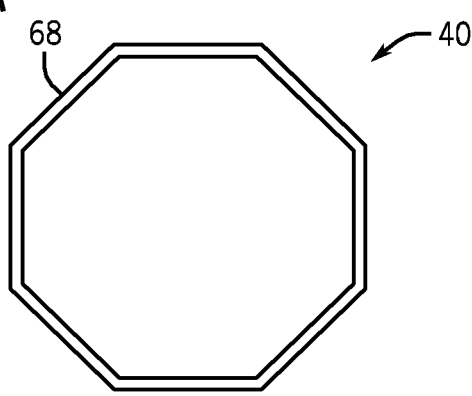
FIG. 13 is a cross-sectional view of an embodiment of the tower sections having a polygonal cross section.

As described above, the sides 68 of the tower sections 40 may have a circular, oval, polygonal, corrugated, or fluted cross-section that both facilitates assembly at the site as well as provides added strength to the tower sections 40. FIG. 13 illustrates a multi-sided cross-section of a polygon. A polygon with as many as 20 side sections, may result in a nearly circular cross-section, but can be constructed with individual bends. In other embodiments, the number of side sections may be 3 to 30 or more.

Figure 11A:
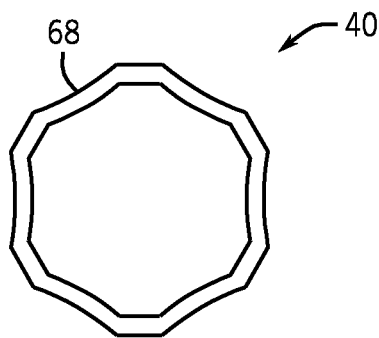
FIG. 11A is a cross-sectional view of an embodiment of the tower sections having a corrugated or fluted cross section.
Figure 11B:
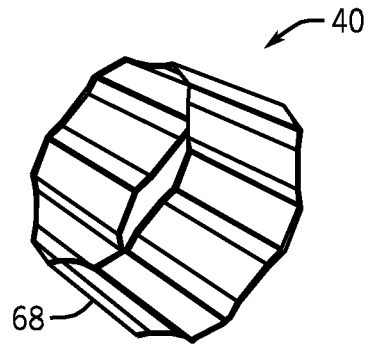
FIG. 11B is a perspective view of an embodiment of the tower sections having a corrugated or fluted cross section.
Figure 12A:
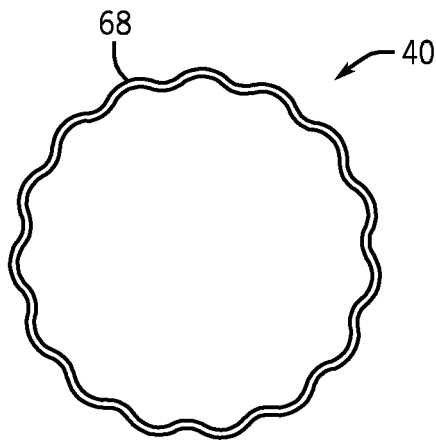
FIG. 12A is a cross-sectional view of an embodiment of the tower sections having a corrugated or fluted cross section.
Figure 12B:
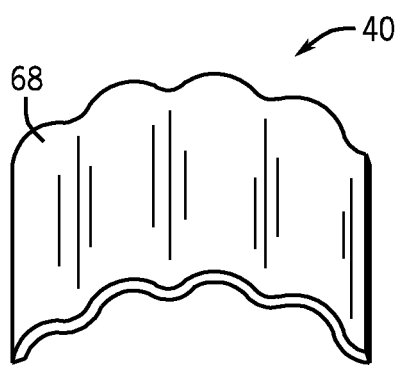
FIG. 12B is a partial perspective view of an embodiment of the tower sections having a corrugated or fluted cross section.

FIGS. 11-12 illustrate a tower section 40 having corrugated or fluted sides 68. As illustrated in FIGS. 11A and 11B, the sides 68 include a plurality of alternating convex and concave sections that include relatively sharp transitions. Unlike the polygonal shape, the bends are not all in one direction. As illustrated in FIGS. 12A and 12B, the sides 68 include a plurality of alternating convex and concave sections that include relatively smooth transitions. As will be appreciated, with respect to FIGS. 11-12, when adjacent tower sections 40 are assembled together, the alternating convex and concave sections of the abutting sides 68 will be aligned before welding the adjacent tower sections 40 together. It should be understood that the corrugated or fluted sides 68 illustrated in FIGS. 11-12 are merely exemplary of the types of tower section sides 68 that may be used. Other types of tower section sides 68 may be used having different cross sections, such as the polygonal, circular, or oval cross sections mentioned above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tower lifting system, comprising:
   a primary lifting system, comprising:
      a lift cap disposed on an axial end of a tower section to be lifted, wherein the lift cap is configured to support the tower section to be lifted, the lift cap having a first plurality of hoists; and
      a lift pole coupled to the lift cap, the lift pole having a lifting mechanism configured to lift the lift cap, the lift pole, and the tower section to be lifted from within a previously lifted tower section; and
   a secondary lifting system directly coupled to the lift cap, wherein the secondary lifting system comprises a second plurality of hoists configured to raise the tower section to be lifted to the lift cap from a tower foundation.

2. The system of claim 1, wherein the lift cap is configured to support a nacelle having a wind turbine rotor and a wind turbine generator of a wind tower system, and wherein the primary lifting system is configured to lift the lift cap with the nacelle on the lift cap.

3. The system of claim 1, wherein the lifting mechanism comprises a plurality of pulleys and cables, wherein a first end of each of the plurality of cables are configured to be coupled to lifting lugs of the previously lifted tower section, and a second end of each of the plurality of cables are configured to be coupled to a respective hoist of the first plurality of hoists.

4. The system of claim 1, comprising a leveling system configured to monitor and adjust an angle of the lift cap.

5. The system of claim 4, wherein the leveling system comprises a leveling sensor disposed on the lift cap and a control system coupled to the leveling sensor and coupled to the first plurality of hoists, wherein the control system is configured to adjust the operating of the first plurality of hoists based on data from the leveling sensor.

6. The system of claim 1, wherein the lift cap comprises guide arms extending down from the lift cap, the guide arms being configured to contact a previously lifted tower section and reduce lateral movement of the lift cap as the lift cap is lifted by the primary lifting system.

7. The system of claim 1, wherein the lift pole is at least twice a height of the tower section to be lifted.

8. The system of claim 1, wherein the lifting mechanism comprises a floatation system having a floatation device disposed on an end of the lift pole opposite the lift cap, the floatation device being disposed within a tank configured to hold a liquid.

9. The system of claim 1, wherein the lifting mechanism comprises a rack and pinion system having a pinion drive coupled to the lift pole, the pinion drive configured to engage with gear teeth of a rail disposed along the previously lifted tower section.

10. The system of claim 1, wherein at least one of the second plurality of hoists is part of the first plurality of hoists.

* * * * *